(No Model.)
S. HANEY.
CONNECTION FOR WINDMILL AND PISTON RODS.
No. 316,031. Patented Apr. 21, 1885.
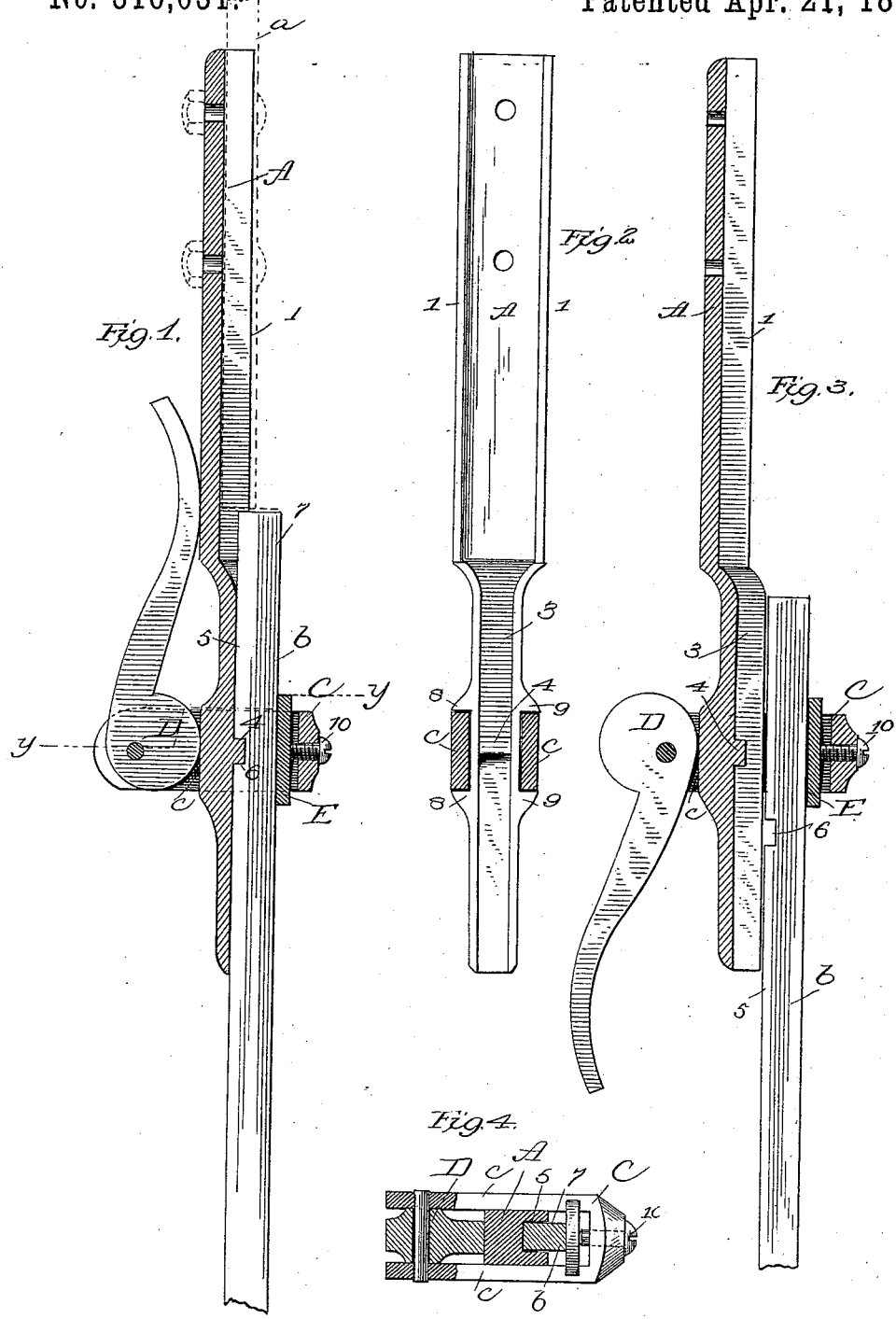

UNITED STATES PATENT OFFICE.

SOLOMON HANEY, OF CEDAR FALLS, IOWA.

CONNECTION FOR WINDMILL AND PISTON RODS.

SPECIFICATION forming part of Letters Patent No. 316,031, dated April 21, 1885.

Application filed September 24, 1884. (No model.)

*To all whom it may concern:*

Be it known that I, SOLOMON HANEY, of Cedar Falls, in the county of Black Hawk and State of Iowa, have invented a new and useful Improvement in Connections for Windmill and Piston Rods; and I do hereby declare that the following is a full, clear, and exact description of the same.

My invention is an improvement in the devices used for connecting the vertically-moving rods of windmills to the piston-rods of pumps.

The object of my invention is to provide a device which, while combining cheapness and simplicity in construction with durability and effectiveness in use, will be of such a character as will connect and securely hold the parts together, and will enable the connection to be made without the aid of tools and with the least expenditure of time and labor, and will also enable the parts to be quickly disconnected should it be desired to stop the working of the pump.

My invention consists of a flanged plate of peculiar form adapted at one end to be attached to the mill-rod and at the other end to receive the rod of the pump; further, in a yoke embracing the two parts (the plate and the mill-rod) and capable of being moved laterally on the flanges of said plate; and, further, in an eccentric pivoted in the ends of said yoke and provided with a suitable handle, whereby the parts may be drawn firmly together and held securely in place.

My invention consists, also, in the various details of construction and arrangement of the parts necessary to the successful carrying out of my invention, all of which are particularly referred to hereinafter, and specifically pointed out in the claims.

In the accompanying drawings, Figure 1 is a vertical sectional view of the connecting-plate, a portion of the piston-rod being shown in side elevation, the parts being shown as connected. Fig. 2 is a view of the connecting-plate detached. Fig. 3 shows the parts disconnected, and Fig. 4 represents a section on the line $y$ $y$ of Fig. 1.

In the drawings, A represents a plate bolted or suitably secured to the ordinary rod, $a$, of the windmill. This plate, being in the form of channel-iron, has flanges 1 1, between which the mill-rod lies. Below the lower end of the mill-rod the flanges 1 1 are brought closer together, so as to form a groove or channel, 3, into which the edge 5 of the piston-rod $b$ of the pump fits snugly. Within the channel a rib, 4, extends transversely from flange to flange, so as to engage a corresponding notch or recess, 6, formed in the edge of the piston-rod. The depth of the channel or groove 3 is such as will receive only a portion of the piston-rod, it (the pump-rod) thus being left protruding therefrom, as shown at 7, Fig. 4.

The device for holding the pump-rod and plate together is clearly shown in Figs. 1 and 4.

About midway of the groove 3 and on the flanges 1 1 thereof are formed or secured cleats 8 8 and 9 9, sufficiently distant from each other to receive the arms $c$ $c$ of the yoke C, and to allow free movement laterally of the same. The yoke embraces the rod $b$ and the plate $a$, as shown in Fig. 4, the arms extending beyond the plate. In the ends of the arms is pivoted an eccentric, D, which, when up in the position shown in Fig. 1, presses against the back of the plate and draws the yoke hard against the rod $b$. This action forces the rod into the groove 3, where, by reason of the rib engaging with the notch, as before described, and the pressure from the eccentric, the rod will be held securely in place and prevented from slipping. The eccentric is provided with any suitable form of handle—such as that shown—which may, if desired, when down, be held by any form of catch suitable for the purpose.

I do not wish to limit myself to the use of the eccentric in this connection, as other devices may be employed to obtain the required pressure with equally good effect, viz., I may construct the yoke with a cross-piece between the ends of the arms $c$ $c$ and pass an ordinary hand-screw through the same, so as to press against the back of the plate A, which will produce the desired effect. When the handle is thrown down to disconnect the part, the yoke is allowed sufficient movement laterally to permit the mill-rod to be withdrawn from the groove. Between the arms of the yoke a plate, E, is inserted, which bears upon the exposed edge or surface of the pump-rod. This plate is acted upon by an adjusting-screw, 10, which extends through the end of the yoke and bears upon the plate. By adjusting this plate by means of the screw more or less pressure can be given to the parts. I prefer to place the rib 4 in the groove in the line along which the pressure is applied. The rib 4 may, however, be formed on the adjustable plate E, instead of in the groove, so that when the pressure is taken from the yoke, the rib will be drawn from engagement with the notch more readily.

It will be easily seen from this description that the parts may be quickly connected and disconnected at will, and as no bolts, nuts, or screws are employed, no tools are necessary to form the connection.

Having thus described my invention, what I claim is—

1. A connecting device for windmill and piston rods, consisting of a plate secured at one end to one of the rods, and adapted at the other end to receive the other rod, a yoke embracing the plate and the unattached rod, and means for operating the said yoke, whereby the plate and rod are held firmly together substantially as described, and for the purpose set forth.

2. A connecting device for windmill and piston rods, consisting of a plate secured at one end to the mill-rod, and adapted at the other end to receive the pump-rod, a yoke embracing the said plate and the pump-rod, and an eccentric journaled in the ends of the yoke, substantially as described, and for the purpose set forth.

3. In the described device, the plate A, bolted to the mill-rod and having the groove or channel 3, the rod b, the yoke C, and the eccentric, all substantially as described.

4. In the described device and in combination with the plate A, having the channel 3, the rib 4, and notch 6 in the mill-rod, substantially as described, and for the purpose set forth.

5. In the described device and in combination, the plate A, rod b, yoke C, eccentric D, the adjustable plate E, and the screw 10, all substantially as described, for the purpose set forth.

In testimony whereof I have signed my name to this specification in the presence of two subscribing witnesses.

SOLOMON HANEY.

Witnesses:
W. C. COURT,
ALFRED GRUNDY.